3,179,319
FASTENER INSERTING MACHINES
Joseph Barker and Lawrence Mawbey, Leicester, England, assignors to United Shoe Machinery Corporation, Boston, Mass., a corporation of New Jersey
Filed Sept. 14, 1962, Ser. No. 223,672
Claims priority, application Great Britain, Sept. 21, 1961, 33,746/61
1 Claim. (Cl. 227—60)

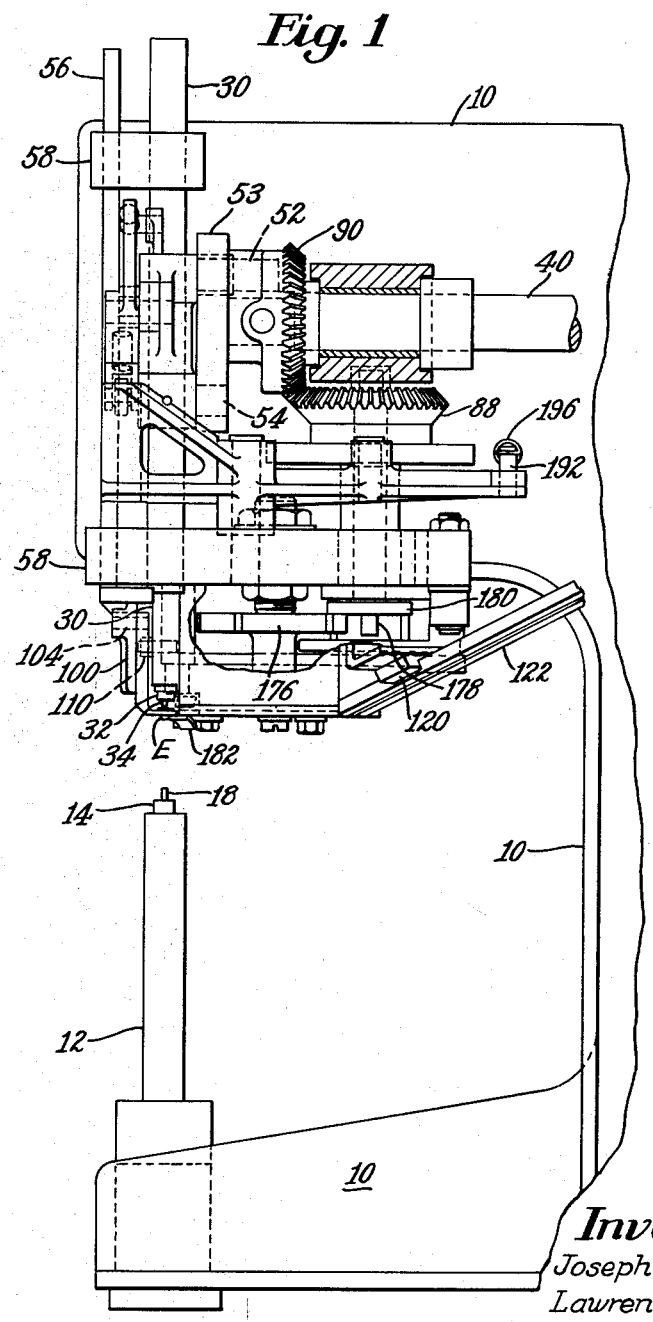

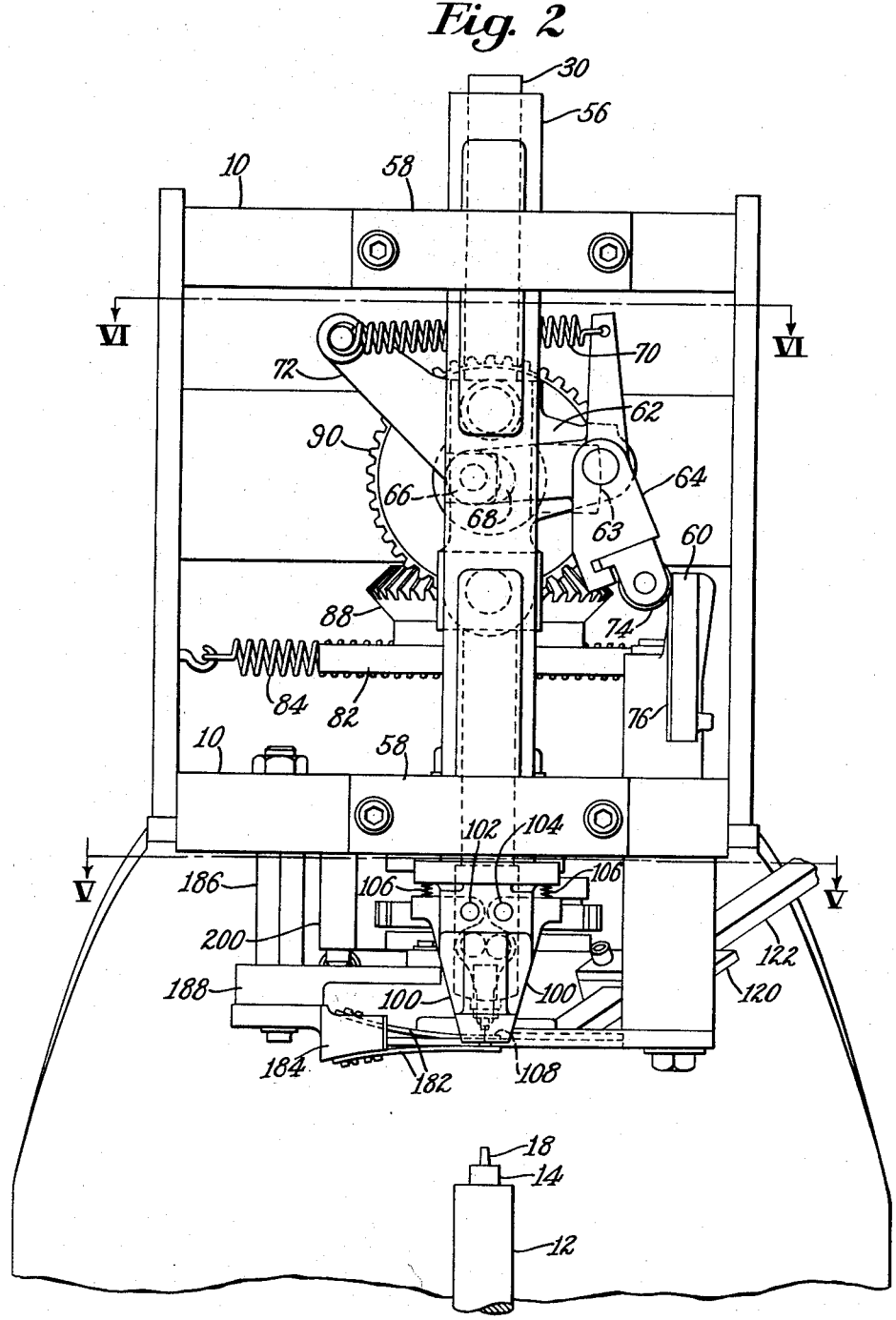

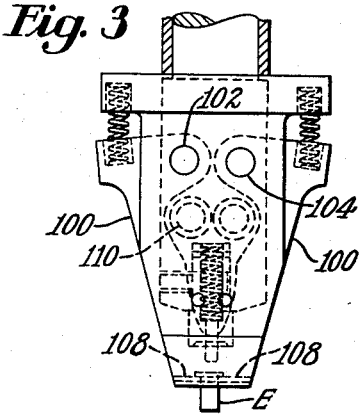
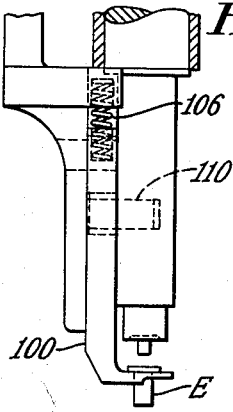
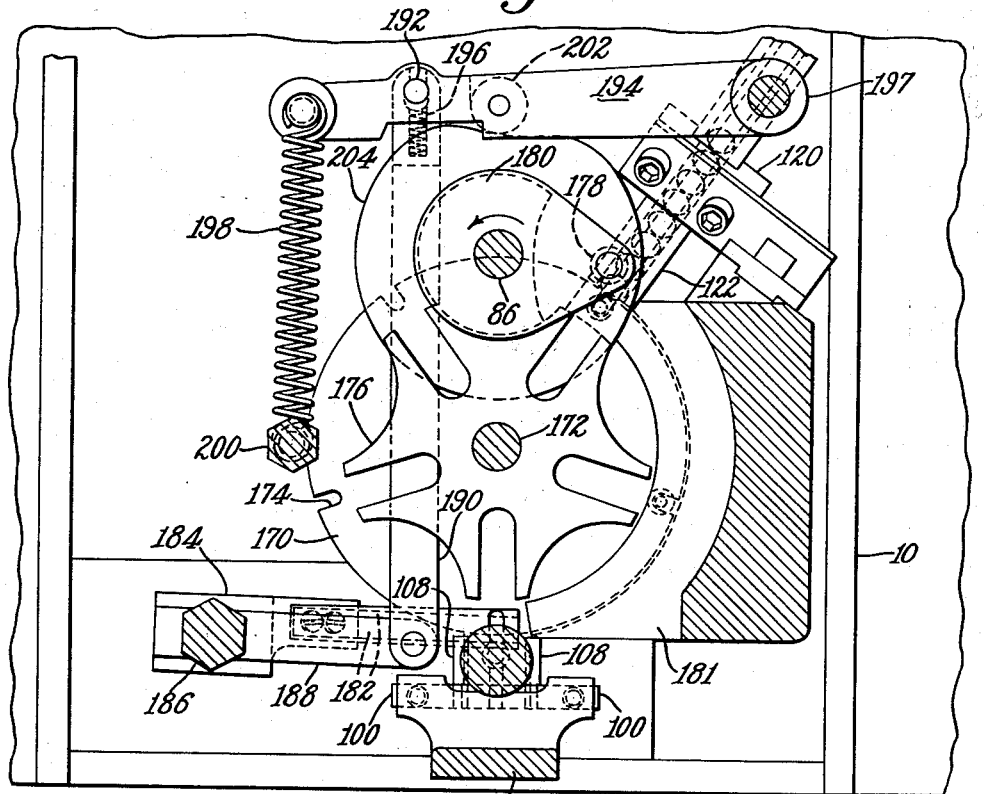

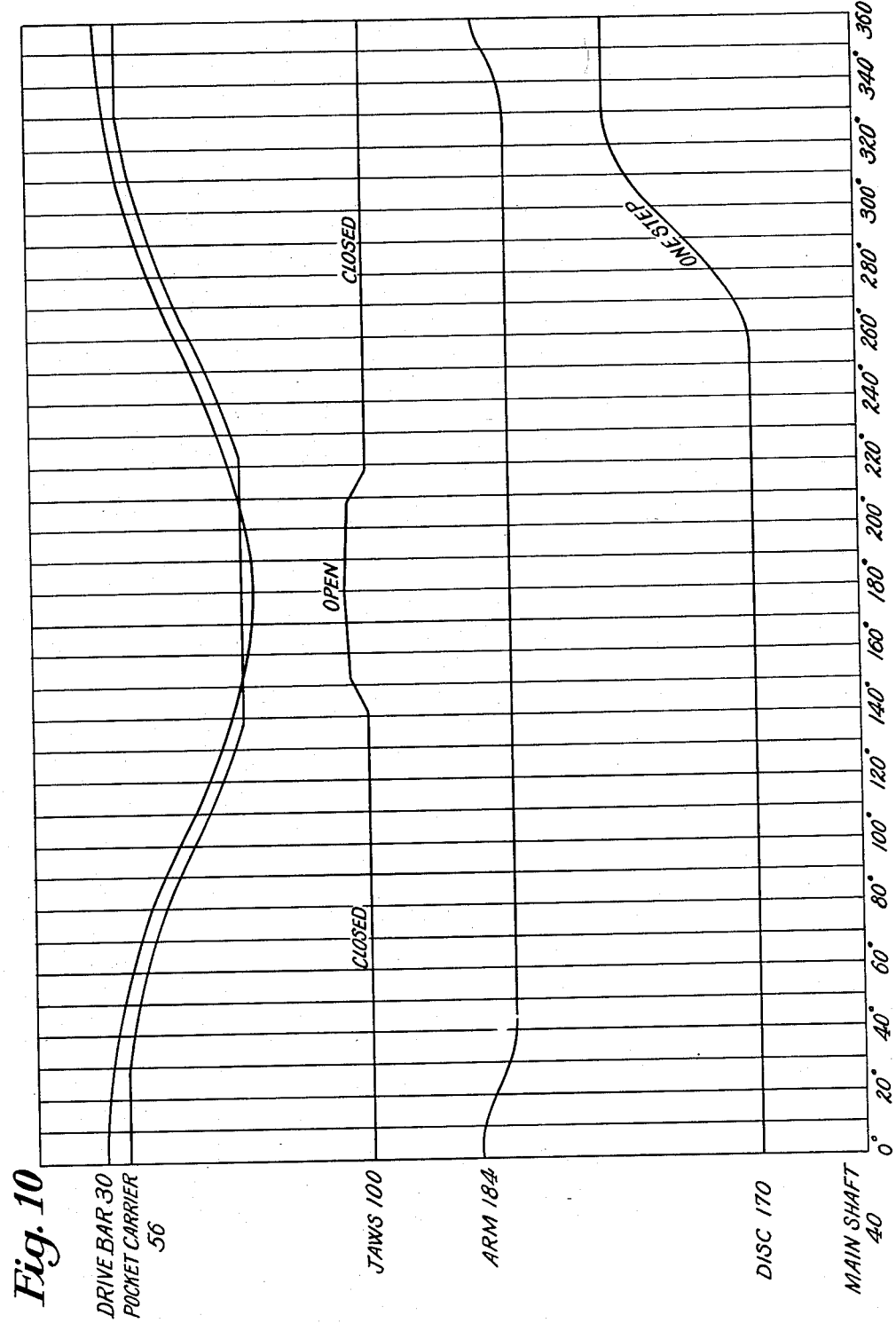

This invention relates to fastener inserting machines, and is especially but not exclusively concerned with eyeletting machines adapted for inserting and setting eyelets in a work piece.

One of the various objects of the present invention is to provide an improved fastener inserting machine capable of operating reliably at a relatively high speed.

Another of the various objects of the invention is to provide an eyeletting machine having improved means for feeding a steady flow of eyelets to the inserting instrumentalities.

The eyeletting machine which is hereinafter described in detail comprises a die holder in the form of a vertically reciprocable driver bar for an upper die of the machine; a fastener support in the form of a vertically reciprocable pocket carrier having two jaws yieldingly urged toward each other to provide a pocket for supporting, in the path of a retractable nipple pin in the upper die, an eyelet to be inserted in a work piece. The machine of the present invention also comprises actuating means for reciprocating the driver bar and pocket carrier; said actuating means comprising a horizontal main shaft eccentrically connected at one end to a link pivoted to the driver bar to move the driver bar up and down, and a bell crank lever pivoted to the driver bar about an axis parallel to the shaft and carrying a pin accommodated in a horizontal transverse slot in the pocket carrier. An arm of the bell crank lever carries a roll which rides up and down against a vertical face of a cam controlled lever, whereby rocking of the bell crank lever and consequent relative movement between the driver bar and pocket carrier, can be effected to advance the upper die relative to the fastener supporting jaws.

The eyelet feeding means comprises a raceway leading to a rotatable, peripherally slotted, horizontal disk by which the eyelets are carried one-by-one to the locality of the jaws on the pocket carrier where cam controlled fingers transfer an eyelet from the disk to the jaws at the end of each cycle of operation of the machine.

The main shaft of the machine is driven through a single revolution clutch on actuation of a treadle by the operator to initiate a cycle of operation in which one eyelet is inserted and set in a work piece.

The invention provides, as one of its several features, a fastener inserting machine comprising a reciprocable die holder, jaws urged toward each other to provide a support, in the path of a die carried by the die holder, for a fastener to be inserted in a work piece, means whereby fasteners from a bulk supply are fed one-by-one to the locality of the jaws, and cam operated means for transferring the fasteners one-by-one into a position on the jaws in which they lie in the path of the die carried by the reciprocable die holder.

The invention also provides, as another of its several features, a fastener inserting machine comprising a reciprocable die holder, a fastener support reciprocable in the same direction as the die holder and arranged to support each fastener in the path of a die carried by the die holder, and actuating means for reciprocating the die holder and fastener support, said actuating means including a lever interconnecting the die holder and fastener support, and cam means for rocking the lever to effect relative movement between the die holder and fastener support thus to control advance of the die holder relative to the fastener support.

The above and other of the various objects and several features of the invention will become clearer from the following description, to be read with reference to the accompanying drawings and will be pointed out in the appended claim.

In the drawings,

FIG. 1 is a view in right-hand side elevation, partly broken away and partly in section, of a fastener inserting machine in which the invention is embodied;

FIG. 2 is a view in front elevation, showing an upper part of the machine with certain parts removed;

FIG. 3 is an enlarged front elevation of the reciprocable die holder and fastener support;

FIG. 4 is a right side elevation of the parts of FIG. 3;

FIG. 5 is a view of parts of the machine as seen in section along the line V—V of FIG. 2;

FIG. 10 is a diagrammatic timing chart of an operating cycle of the illustrative machine.

Figure 7:
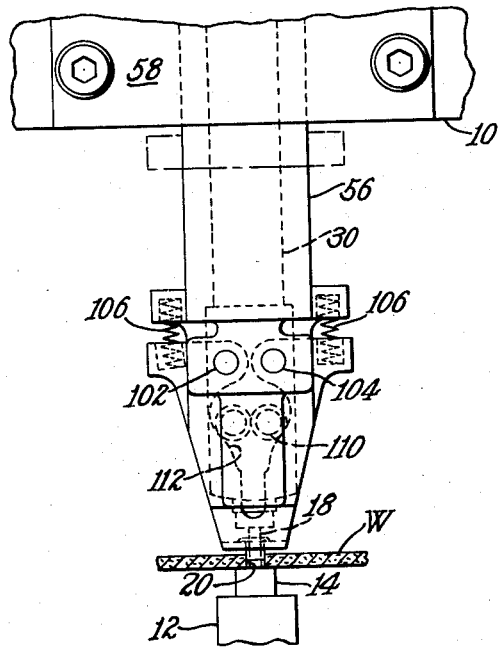
FIGS. 7, 8 and 9 are part sectional fragmentary views of eyelet inserting parts, showing their relative positions at different stages in an operating cycle of the machine.
Figure 8:
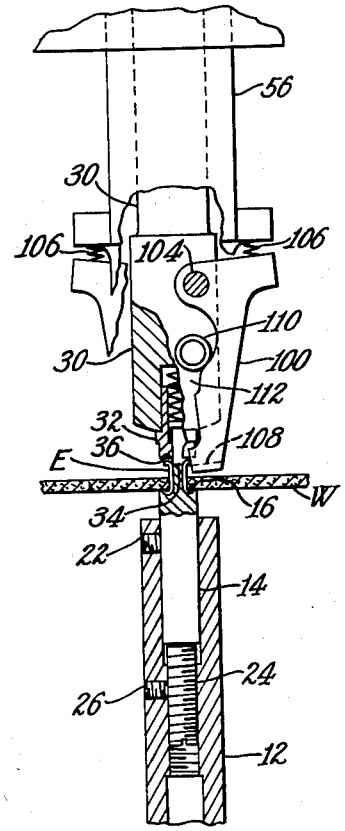

The illustrative machine comprises a hollow C-shaped frame 10 (FIG. 1) adapted to stand upon a bench. At the front of a lower portion of the frame there projects upward a pillar 12 on which is mounted a lower die 14. The die 14 has a face 16 (FIG. 8), against which a tail end of an eyelet E is pressed to form an outward flange when the eyelet is set in a hole 20 (FIG. 7) in a work piece W, and a pin 18 upstanding from the center of the face 16. Preparatory to an eyelet setting operation, the work piece W is positioned on the die 14 with the pin 18 accommodated in the hole 20 in which the eyelet is to be set. The die 14 is releasably secured in the pillar 12 by a set screw 22 (FIG. 8). After heightwise adjustment of a screw 24 threaded in a vertical tapped bore in the pillar and likewise releasably fixed by a set screw 26, the bottom of the die 14 rests on the adjusted screw 24 to determine the heightwise position of the die.

Mounted for vertical, or substantially vertical, reciprocation in an upper part of the frame 10 that overhangs the lower die 14, is a driver bar 30 (FIGS. 1, 2, 7, 8 and 9) which, at its lower end, carries an upper die 32. The upper die 32 has a die face 36 (FIG. 8) through which passes centrally a spring pressed nipple pin 34 which enters the barrel of an eyelet E and assists in guiding it so that it is received over the pin 18 of the lower die. In the operation of the machine, when the nipple pin 34 engages the pin 18, the eyelet is thrust against the lower die by the die face 36 of the upper die while the spring behind the nipple pin yields.

Means for reciprocating the driver bar 30 comprises a horizontal, forwardly and rearwardly extending main power shaft 40 (FIGS. 1 and 6) driven through a single revolution clutch (not shown). At its forward end, the shaft 40 provides support for an eccentric pin 52 (FIG. 1) on which is pivoted a link 53 which is pivotally connected at 54 to the bar 30. Rotation of the shaft 40 thus results in up and down movement of the bar 30.

Figure 6:
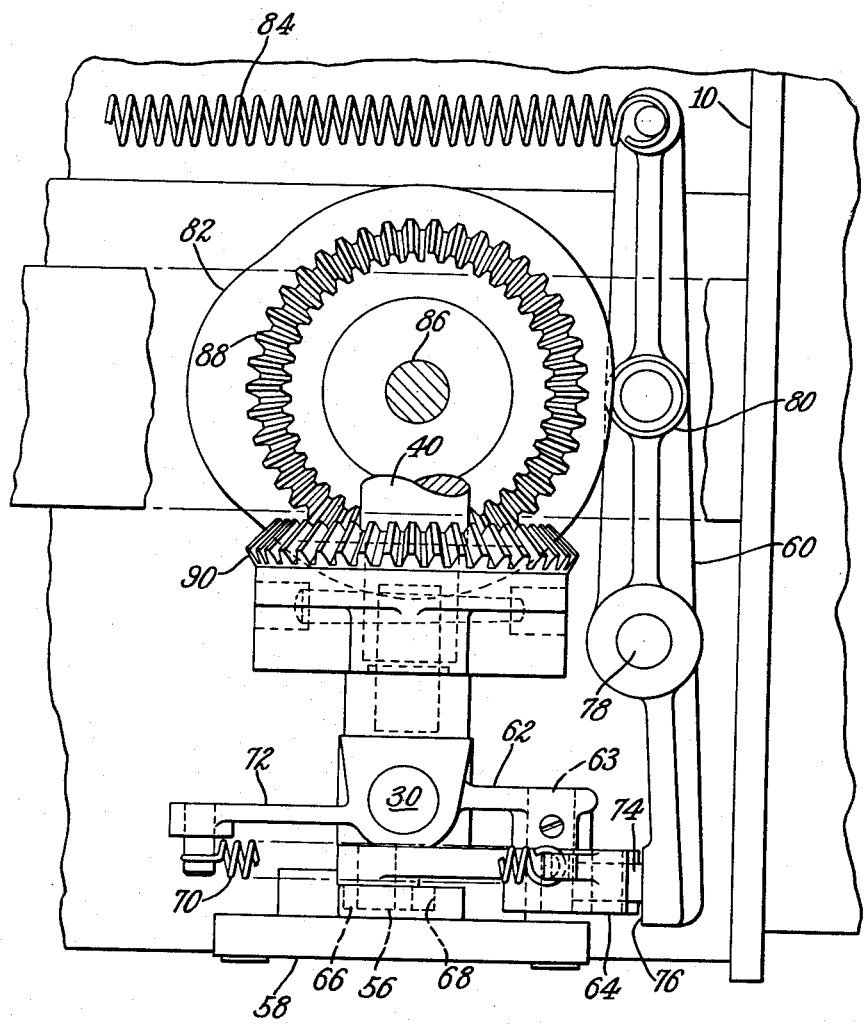
FIG. 6 is a view in section on the line VI—VI of FIG. 2.

In front of the driver bar 30, mounted for vertical, or substantially vertical reciprocation, is a pocket carrier 56. Bearings for the driver bar 30 and carrier 56, to hold them spaced apart, are secured to the frame 10 by clamping bars 58. The carrier 56 is coupled to the driver bar 30, to receive reciprocatory motion therefrom, but is also capable of movement relative to the driver bar under the influence of a control device comprising a cam-operated lever 60 (FIG. 6). Thus, the driver bar 30 has a projecting ear 62 (FIGS. 2 and 6) on which is pivoted at 63 a bell crank lever 64. One arm of the lever 64 carries a roll 66 which is accommodated in a horizontal slot 68 in the carrier 56. A tension spring 70 acts between an upwardly extending arm of the lever 64 and another ear 72 of the driver bar 30 to urge the carrier 56 downwardly relative to the driver bar 30 about the pivot at 63. Such downward movement is limited, however, by engagement of a roll 74 carried by a third arm of the bell crank lever 64 with a flat vertical face 76 of the lever 60 up and down which the roll 74 is free to ride when up and down movement is imparted to the driver bar. The lever 60 is mounted to swing about a vertical pivot pin 78 (FIG. 6) and carries a roll 80 which engages the peripheral face of a cam 82 toward which it is urged by a tension spring 84. The cam 82 is mounted for rotation on a vertical shaft 86 mounted in bearings in the frame 10 and coupled to the shaft 40 by bevel gears 88, 90. Thus, as the shaft 40 rotates to lower the driver bar 30, the pocket carrier 56 descends with it while the lever 60 remains stationary, but as the bar 30 approaches the lower end of its stroke, the lever 60 swings to move the face 76 toward the path of the carrier 56 and thus, in a manner determined by the shape of the cam 82, to control the lowermost portion of the stroke of the carrier and its rest position at the end of its stroke as the driver bar continues to descend.

At its lower end, the pocket carrier 56 is provided with two jaws 100 (FIGS. 2, 7, 8 and 9). The jaws 100 are pivoted to the carrier 56 on separate pins 102, 104 and are urged into a closed condition by compression springs 106. When in such closed condition, rearwardly projecting shoulders 108 (FIGS. 3, 4 and 5) formed on the jaws provide a support for the flange of an eyelet E. When the jaws are opened, by swinging about the pins 102, 104 against the action of the springs 106, the shoulders are separated far enough to allow the eyelet to fall between them. Opening of the jaws takes place when the carrier 56 is approaching the end of its downward stroke (FIGS. 8 and 9), and the lever 60 is swinging to allow the driver bar 30 to advance downwardly relative to the carrier 56. The driver bar is provided with two forwardly projecting pins 110 (FIGS. 1, 4, 8 and 9) that lie between cam faces 112 of the jaws so that, at the proper time in the operation of the machine, the jaws are separated by engagement of the faces 112 by the pins 110 of the relatively advancing driver bar. When the pocket carrier 56 is in its uppermost position (in which position it lies when the machine is at rest) the jaws 100 provide a pocket into which an eyelet can be slid from the rear to rest upon the shoulders 108 in alinement with the upper die so that during the operative downward stroke of the driver bar 30 the nipple pin 34 will enter the barrel of the eyelet.

Means for feeding eyelets E one by one to the pocket provided by the jaws 100 will now be described. Secured to the right-hand side of the frame 10 is a bracket 120 (FIGS. 1 and 2) that supports a lower end portion of a raceway 122 that leads from a hopper (not shown) into which can be poured a supply of eyelets E. Opposite the lower end of the raceway 122 is a feed disk 170 (FIG. 5) mounted on a vertical spindle 172 supported by bearings in the frame 10. The feed disk 170 is recessed at five evenly spaced localities around its periphery to provide slots 174 for the reception of the barrels of eyelets E while the flanges of the eyelets rest on a flat upper surface of the disk. The disk 170 rotates step by step as it is indexed during the operation of the machine (one step for each cycle of operation) to bring the slots one by one to rest opposite the pocket provided by the jaws 100. The raceway 122 is so positioned that when the disk 170 is at rest with one slot opposite the pocket, as just mentioned, another slot is opposite the end of the raceway so that an eyelet slides from the inclined raceway into the intercommunicating slot in the feed disk. Step by step indexing rotation is imparted to the feed disk by a Geneva mechanism comprising a peripherally slotted star wheel 176 on the spindle 172 and a roll 178 cooperative therewith carried eccentrically by a flange 180 on the shaft 86. Thus, for each revolution of the shaft 86, the feed disk 170 turns through 72° clockwise (as viewed from above). A stepped plate 181 abuts and overlies the margin of the feed disk 170 between the end of the raceway and the pocket to prevent the eyelets falling from the disk.

The lower end of the raceway 122, the upper surface of the feed disk 170 and the shoulders 108 of the jaws 100 are all on the same horizontal level, so that an eyelet E can readily slide from the raceway to the feed disk (pushed by the following eyelets in the raceway), and be transferred from the disk to the shoulders 108 by a pair of fingers 182. The fingers 182 consist of thin spring metal strips and each is mounted on an arm 184 in such a manner that an upper one of the fingers bears on the upper surface of the feed disk 170 while the lower one bears on the under surface. The disk 170 is sufficiently thin that the barrel of an eyelet E, resting in one of the slots 174 with its flange on the upper surface of the disk, projects below the under surface. Thus, by adjusting the relative positions of the fingers 182 on the arm 184, the fingers can be arranged to engage an eyelet above and below the disk. The arm 184 is mounted at the lower end of a vertical shaft 186 journaled in the frame 10. A second arm 188, also secured to the shaft 186, is pivotally connected to a rearwardly extending link 190 which at its rearward end is slotted longitudinally to receive a pin 192 extending from a lever 194. A spring 196 urges the link 190 rearwardly to the limit imposed by engagement of the rear end of the slot with the pin 192. The lever 194 is pivoted upon the frame 10 at 197, and is urged forwardly by a tension spring 198 acting between the lever and a post 200 depending from the frame. The lever 194 carries a roll 202 which rides against a peripheral face of a cam 204 mounted on the shaft 86, the spring 198 urging the roll into engagement with the cam face. The arrangement is such that in a cycle of operation of the machine, the fingers 182 slide an eyelet E forwardly from the feed disk 170 onto the shoulders 108 of the jaws 100; movement of the fingers, to effect such transfer of the eyelet, being yieldingly imparted by the spring 198 under control of the cam 204.

Figure 9:
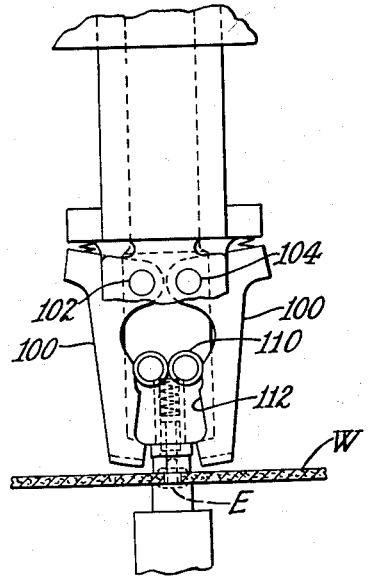

In a cycle of operation of the machine, assuming that there is a supply of eyelets E in the supply hopper, and that the machine has been through at least two previous cycles to allow the feed disk 170 to bring an eyelet to the pocket provided by the jaws 100 into which, at the conclusion of the previous cycle the eyelet will have been transferred; and assuming that the operator has positioned a work piece W over the die 14, the treadle (not shown) is depressed to trip the clutch and to initiate one revolution of the shafts 40 and 86. The driver bar 30 and pocket carrier 56 now descend together (see FIG. 10); the lever 60 swinging through a small angle as the roll 80 follows the cam 82, so that the driver bar advances relative to the carrier with the result that the nipple pin 34 enters the barrel of the eyelet E. The roll then follows a circular portion of the cam 82 with the result that no relative movement between the bar and carrier takes place (FIG. 7). Thereafter, the bar again advances and the jaws begin to open (FIG. 8). Descent of the jaws until they are close to the work piece continues before they are wide enough apart to allow the eyelet to pass between them, after which descent of the jaws stops and as the lever 60 continues to swing to keep the carrier 56 still while the driver bar continues to descend; the upper die thrusts the eyelet through the hole in the work piece and against the face 16 of the lower die to set it (FIG. 9). Continued rotation of the shaft 40 then lifts the driver bar 30, the carrier 56 also rising and the lever 60 swinging back into its former position. Upward movement of the bar and carrier continues until they reach the tops of their strokes; the shoulders 108 of the jaws 100 are now level with the upper face of the feed disk 170. During the eyelet setting operation and during the return of the bar 30 and of the carrier 56 to their uppermost positions, the feed disk has rotated through 72°. The arm 184 is now rocked to allow the fingers 182 to transfer a fresh eyelet from the disk 170 to the shoulders 108 of the jaws; the arm 184 awaiting return to its former position at the beginning of the next cycle, and the machine being restored to its at rest condition ready for another cycle of operation.

Having thus described our invention, what we claim as new and desire to secure by Letters Patent of the United States is:

In a fastener inserting machine, a cyclically reciprocable fastener inserting tool, means reciprocably mounted for releasably supporting in coaxial relation to the tool a fastener to be inserted thereby in a workpiece, means for feeding successive fasteners under continuous positioning control from a source of supply to said supporting means, said feeding means including a raceway extending from the supply source, a fastener carrying disk having peripheral, equi-spaced slots adapted to receive successive endmost fasteners from the raceway, means for indexing the disk in each cycle of the machine, and means including a pair of spring-fingers movable one on either side of said indexing disk and operatively connected to said disk indexing means for transferring successively indexed fasteners from the disk onto said supporting means in coaxial relation to the tool, said fingers being engageable with each fastener at spaced points thereon during transfer, mechanism for cyclically moving the tool and said supporting means toward and from the workpiece, and mechanism operatively connected between the tool and said supporting means for causing the tool relatively to advance and overtake the fastener fed to the supporting means in the course of each inserting stroke thereby to release the supporting means from the fastener and thereupon effect insertion of the latter in the workpiece.

References Cited by the Examiner
UNITED STATES PATENTS

| | | | |
|---|---|---|---|
| 1,036,211 | 8/12 | Fraser | 1—6 |
| 1,825,210 | 9/31 | Seely | 1—6 |
| 1,832,681 | 11/31 | Alford | 218—2 |

GRANVILLE Y. CUSTER, Jr., *Primary Examiner.*